Figure 1:
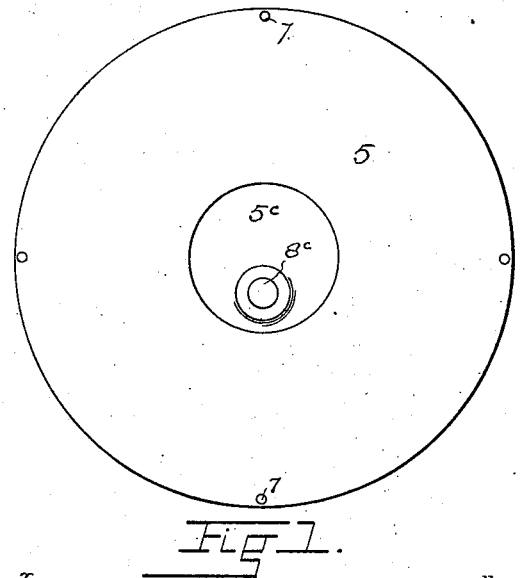

(No Model.)

G. BEAUCHAMP.
TRACTION WHEEL.

No. 532,941. Patented Jan. 22, 1895.

WITNESSES:
C. J. Dollaudt
Chas. E. Dawson

INVENTOR
Geo. Beauchamp.
BY
A. J. O'Brien
ATTORNEY

THE NORRIS PETERS CO., PHOTO-LITHO., WASHINGTON, D. C.

UNITED STATES PATENT OFFICE.

GEORGE BEAUCHAMP, OF LA VETA, COLORADO, ASSIGNOR TO JEROME B. PETRIE, OF SAME PLACE.

TRACTION-WHEEL.

SPECIFICATION forming part of Letters Patent No. 532,941, dated January 22, 1895.

Application filed March 24, 1894. Serial No. 505,027. (No model.)

*To all whom it may concern:*

Be it known that I, GEORGE BEAUCHAMP, a citizen of the United States of America, residing at La Veta, in the county of Huerfano and State of Colorado, have invented certain new and useful Improvements in Mechanical Powers as Applied to Vehicle-Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in vehicle wheels; and my object is to increase the leverage of a vehicle wheel of a given diameter; to lower its axle or load-carrying point, and to lessen the rotary movement of the axle thereof in its journal bearings, when the axle is secured to the wheel—or to lessen the rotary movement of the wheel around its axle, when loosely mounted on such axle.

Another object of my invention is to obtain a vehicle wheel, which, when used as a traction wheel, will, in the making of a given number of revolutions of the axle thereof, propel the vehicle of which it forms the driver a greater distance than with an ordinary driving or traction wheel of equal diameter therewith, the axle whereof is rotated in unison with the axle on my improved wheel.

In the vehicle wheel as heretofore constructed—whether to be used as a gravity or as a traction wheel, the axle extends to, and through, the mathematical center thereof; and hence, the leverage of such wheel is its radius, that is, the distance from the mathematical center of the wheel to the periphery thereof.

My improved wheel is so constructed that the load is supported at a point above the center of the wheel. Hence, what I term the point of ultimate support or bearing is located above the mathematical center of the wheel; that is to say, the mechanical center of the wheel is located above its mathematical center. To accomplish this, I construct my improved wheel of two independent parts, namely: an inner flanged disk carrying journals adapted to engage suitable boxes on the frame of the vehicle; and an outer casing forming the wheel proper, and interiorly shouldered to support the flange of the inner disk, the construction and arrangement of the parts being such that the periphery of the disk, when connected with the casing in operative relation, clears the inner periphery of the casing. Hence, the load composed of the vehicle frame and its burden, and which rests or bears directly upon the journals of the disk, is ultimately supported upon the shoulder, or shoulders, of the casing, which are engaged by the flange or flanges of the disk. This shouldered bearing or ultimate support for the load is located at a suitable distance out from the center,—that is, between the center of the periphery of the wheel or casing upon which it is formed.

Having thus briefly outlined my improved wheel, and its purpose or object, I will now proceed to describe in detail, a construction embodying what is deemed the essential features of the invention, reference being had to the accompanying drawings in which is illustrated an embodiment thereof.

Figure 2:
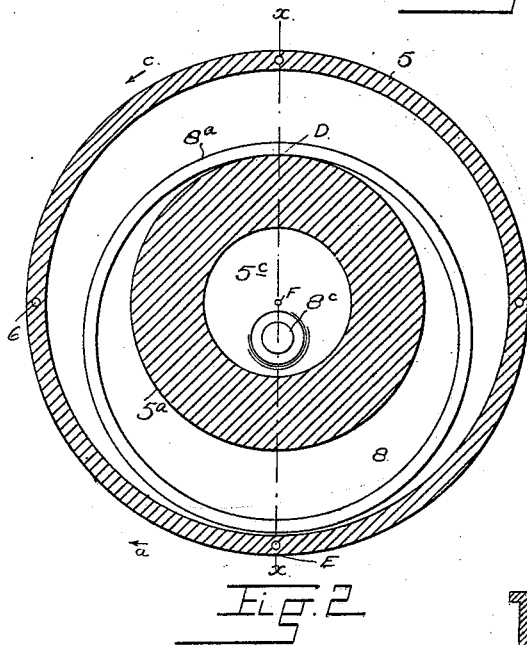
Figure 3:
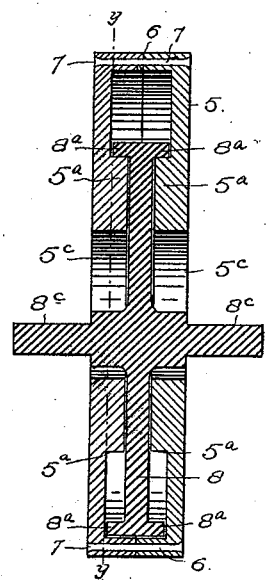
Figure 4:
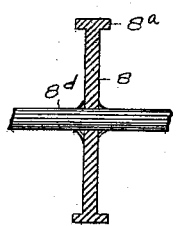

In the drawings, Figure 1 is a side elevation of the wheel. Fig. 2 is a section taken on the line $y—y$, Fig. 3. Fig. 3 is a section taken on the line $x—x$, Fig. 2. Fig. 4 illustrates the inner disk of the wheel mounted on an independent axle.

Similar reference characters indicating corresponding parts or elements in the views, let the numeral 5 designate the outer part or portion of the wheel, hereinafter termed the outer casing of the wheel, which, as shown in the drawings, is composed of two parts fashioned to engage each other as shown at 6, and fastened together by any suitable means, as by rivets 7. This outer casing may have a tire placed thereon in the ordinary way of placing tires on vehicle wheels. Each part of the casing 5 is provided on its inner surface with an annular concentric shoulder $5^a$. The shoulder parts form the support or bearing for the counterpart flanges $8^a$ formed on the disk 8. The disk carries journals $8^c$ located at its center and adapted to engage the boxes located on the frame of the vehicle to which the wheel is attached. In lieu of the journals, the disk may be provided with an axle $8^d$ made fast on the frame of the vehicle. In this case, the disk turns on the axle which remains stationary with reference to the rotary movement of the disk. This construction is shown in Fig. 4. The casing 5 is provided with an opening $5^c$ to permit the rotation of the casing without engaging the journals or axle of the disk 8. The disk 8 occupies an eccentric position within the casing 5. The disk engages the casing at but one point, which point, when the vehicle is at rest on a level surface, lies in a perpendicular passed through the center of the wheel, and above that center. The periphery of the disk does not touch the casing of the wheel, its nearest point of approach being directly below the center of the disk, and in the same perpendicular as the point of engagement, or bearing point above.

From the foregoing description, it will be observed that if the wheel is traveling on any surface in the direction indicated by arrow $a$, by the axle being drawn forward or pushed backward, it will rotate in the direction indicated by arrow $c$; and if the axle be rotated in the direction indicated by arrow $c$, the vehicle will move in the direction indicated by arrow $a$. In either case, the point of ultimate support for the load will be at D (see Fig. 2), and the leverage of the wheel will be measured by the distance between the point D and the point E where the wheel engages the surface over which it is moving. Hence, I term the point D, the mechanical center of the wheel, since its mechanical power or leverage is measured from this center, and as distinguished from its mathematical center, which would ordinarily be the center of the casing 5. By reference to the drawings, it will be observed that the axle $8^c$ or $8^d$ is below the mathematical center of the wheel composed of parts 5 and 8, and the center of gravity of the load supported upon the axle, will be lower than if such axle were secured to, or extended through, the mathematical center of the wheel, as in ordinary vehicle wheels. It will also be observed that if the axle $8^c$ be rotated (in using the wheel as a traction wheel), the peripheral shoulder $8^a$, being of greater circumference than is peripheral shoulder $5^a$, a complete rotation of axle $8^c$ and peripheral shoulder $8^a$, will produce more than a single rotation of peripheral shoulder $5^a$ and casing 5; and hence, a complete rotation of the axle will cause more than one revolution of the wheel, or the part thereof in contact with the traction surface; and the wheel will be propelled a greater distance than if the axle secured to and rotating with the part (casing 5) in contact with such traction surface, were rotated once.

Having thus described my invention, what I claim is—

1. A vehicle wheel composed of a circular part forming the tread, peripheral shoulders concentrically mounted on the tread by connecting webs, a hub, an axle, a peripheral shoulder of larger diameter than first named shoulders, and a web extending from the hub to the peripheral shoulders of larger diameter, whereby the axle is supported by the peripheral shoulders of the lesser diameter engaging with the peripheral shoulders of larger diameter at a point above such axle, substantially as described.

2. A vehicle wheel composed of an axle, a circular part having a peripheral shoulder thereon concentric with the axle, and a second circular part of larger diameter having a peripheral shoulder of less diameter than the first named peripheral shoulder, the peripheral shoulder of larger diameter resting on and supported by the peripheral shoulder of lesser diameter at a point thereon above the axle of the wheel, substantially as described.

3. A vehicle or traction wheel composed of two circular parts, one part forming a tread and having a concentric shoulder located between the tread and the mathematical center of the wheel, said shoulder forming a support for the other part which is of greater diameter than said shoulder, the point of engagement between the two wheel-parts being located above the mathematical center and forming the mechanical center of the wheel, substantially as described.

In testimony whereof I affix my signature in the presence of two witnesses.

GEORGE BEAUCHAMP.

Witnesses:
WILLIAM D. TREMAINE,
THOS. J. MCEWING.